United States Patent [19]  
Cahill et al.

[11] Patent Number: 4,755,051  
[45] Date of Patent: Jul. 5, 1988

[54] VIBRATING OPTICAL FIBER ACCELEROMETER AND GYROSCOPE

[75] Inventors: Richard F. Cahill, El Toro; Eric Udd, Huntington Beach, both of Calif.

[73] Assignee: McDonnell Douglas Corporation, Long Beach, Calif.

[21] Appl. No.: 785,336

[22] Filed: Oct. 7, 1985

[51] Int. Cl.$^4$ .............................................. G01B 9/02  
[52] U.S. Cl. .................................... 356/345; 356/350  
[58] Field of Search .................... 356/72, 350, 345; 250/227; 73/488, 517 AB; 324/96

[56] References Cited

U.S. PATENT DOCUMENTS 4,345,482  8/1982  Adolfsson et al. ............. 250/227 X  
4,452,531  6/1984  Person ............................ 356/350 X  
4,645,345  2/1987  Domann ............................. 356/350

FOREIGN PATENT DOCUMENTS 0135816  7/1985  Japan .................................. 356/350

Primary Examiner—Eugene R. LaRoche  
Assistant Examiner—Robert J. Pascal  
Attorney, Agent, or Firm—Benjamin Hudson, Jr.; George W. Finch; John P. Scholl

[57] ABSTRACT

There is provided by this invention a fiber optic transducer for accelerometers and gyroscopes that utilize an optical fiber suspended between two points and supported on a vibrating platform such that the optical fiber is deflected to cause light passing through the fiber to be phase modulated. When the device is accelerated, the deflection of the vibrating fiber is assymetrical, and the light passing through the fiber is phase modulated at frequency 'f' and odd harmonics of 'f'. The first in odd harmonic phase modulation has an amplitude proportional to the acceleration and a phase relative to the driving signal that depends on the direction of acceleration.

14 Claims, 4 Drawing Sheets

VIBRATING OPTICAL FIBER ACCELEROMETER AND GYROSCOPE

BACKGROUND OF THE INVENTION

1. Field of the Invention

This invention relates generally to solid state accelerometers and gyroscopes for guidance and control systems, and more particularly to, solid state accelerometers and gyroscopes that utilize fiber optic transducers and modulators.

2. DESCRIPTION OF THE PRIOR ART

Cost, performance limitations, and reliability problems of mechanical gyros and accelerometers have stimulated the development of solid state fiber optic gyros. Presently, ring laser gyros have demonstrated reliable performance and have been widely accepted as the state of the art in gyroscope technology for high performance applications. However, ring laser gyros are not completely solid state and require large and costly high quality optical components. Although investigators have been increasing the effectiveness and reliability of ring laser gyros, no genuine breakthrough in a low cost solid state gyro with wide dynamic range capability has occurred using the ring laser gyro concept.

A completely solid state fiber optical gyro having a wide dynamic range was disclosed in U.S. Pat. No. 4,299,490, issued to Richard F. Cahill, et al on Nov. 10, 1981 entitled "Phase Nulling Optical Gyro" and assigned to the assignee of the instant application. This patent advanced the fiber optic gyro technology by allowing the fiber optical gyro to have performance characteristics similar to those of the ring laser gyro while maintaining the advantages of a solid state embodiment.

It is an object of this invention to add accelerometer capabilities to guidance and control systems having a frequency output scheme that is compatible with demodulation methods used in fiber optical gyros such as the one described in the reference patent. Another object of this invention is to allow accelerometers to be multiplexed with the fiber optical gyros to form a multisensor capable of measuring both acceleration and rotation.

SUMMARY OF THE INVENTION

There is provided by this invention a solid state device for measuring acceleration in guidance and control systems having a fiber optic modulator that is comprised generally of an optical fiber suspended between two points under tension and vibrated by a vibrating means at a frequency 'f'. When the device is accelerated, the deflection of the vibrating fiber is asymmetrical and the light passing through the fiber is phase modulated at frequency f and odd harmonics of f. The first and odd harmonic phase modulation has an amplitude proportional to the acceleration and a phase relative to the driving signal that depends on the direction of acceleration.

BRIEF DESCRIPTION OF THE PREFERRED EMBODIMENT

Figure 1:
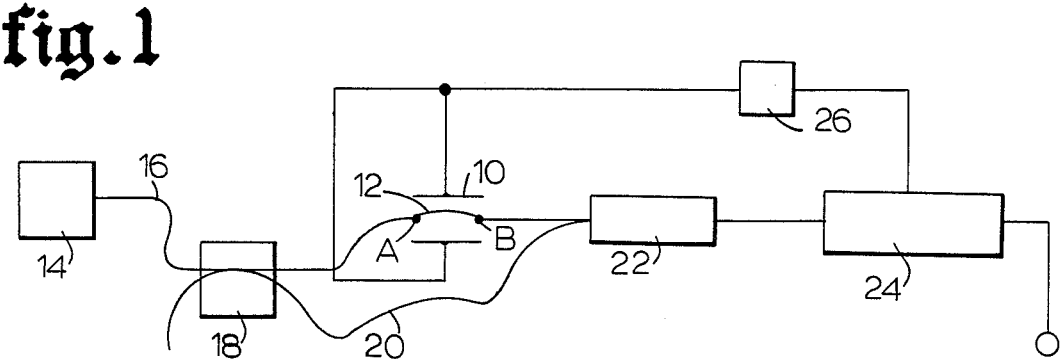
FIG. 1 is a schematic representation of an accelerometer incorporating the principles of this invention.

Referring to FIG. 1, there is shown an accelerometer that is based on the Mach-Zehnder interferometer. The basic operating principles employed are centered around a vibrating fiber modulator 10. The modulator 10 is comprised generally of a short length of optical fiber 12 suspended on a platform between two suspension points A and B under tension and vibrated at a frequency f. The optical fiber may be a single mode fiber and to constrain vibration to one plane may be a substantially flat fiber. The fiber may be vibrated by such techniques as a piezoelectric driver, solenoid, speaker coil, magnetic or electric deflection. In the absence of acceleration, the fiber is stretched at the extreme amplitude of each cycle and relaxed as it passes the centerline. This causes the light passing through the fiber to be phase modulated at 2f and higher order even harmonics of f. When the device is accelerated, the deflection of the vibrating fiber is asymmetrical and the light passing through the fiber is phase modulated at frequency f and the odd harmonics of f. The first and odd harmonic phase modulation has an amplitude proportional to the acceleration and a phase relative to the driving signal that depends on the direction of acceleration. This accelerometer may be implemented in any form of fiber optic interferometer capable of measuring phase. A light source 14 inputs a light beam into the optical fiber 16 in the direction of a beam splitter 18. The light source may be a laser diode, light emitting diode, or superradiant diode. The light is split into two paths by the beam splitter 18 and is transmitted into the reference fiber 20 and the vibrating fiber modulator 10. The output of the vibrating fiber modulator 10 and the reference fiber 20 is connected to a phase demodulator 22. A synchronous demodulator 24 is connected to the output of the phase demodulator 22. Also, an oscillator 26 which drives the vibrating fiber modulator at a frequency f has its output connected to the synchronous demodulator 24. The light signals passing through the vibrating fiber modulator 10 and the reference fiber 20 are compared by the phase demodulator 22. The synchronous demodulator 24 acts in combination with the oscillator 26 to extract the output signal. In a similar manner the 3rd and higher order harmonics of f could be used for detection. In developing sophisticated guidance and control systems, an accelerometer as described above would be a natural compliment to fiber optic gyro systems.

Figure 2:
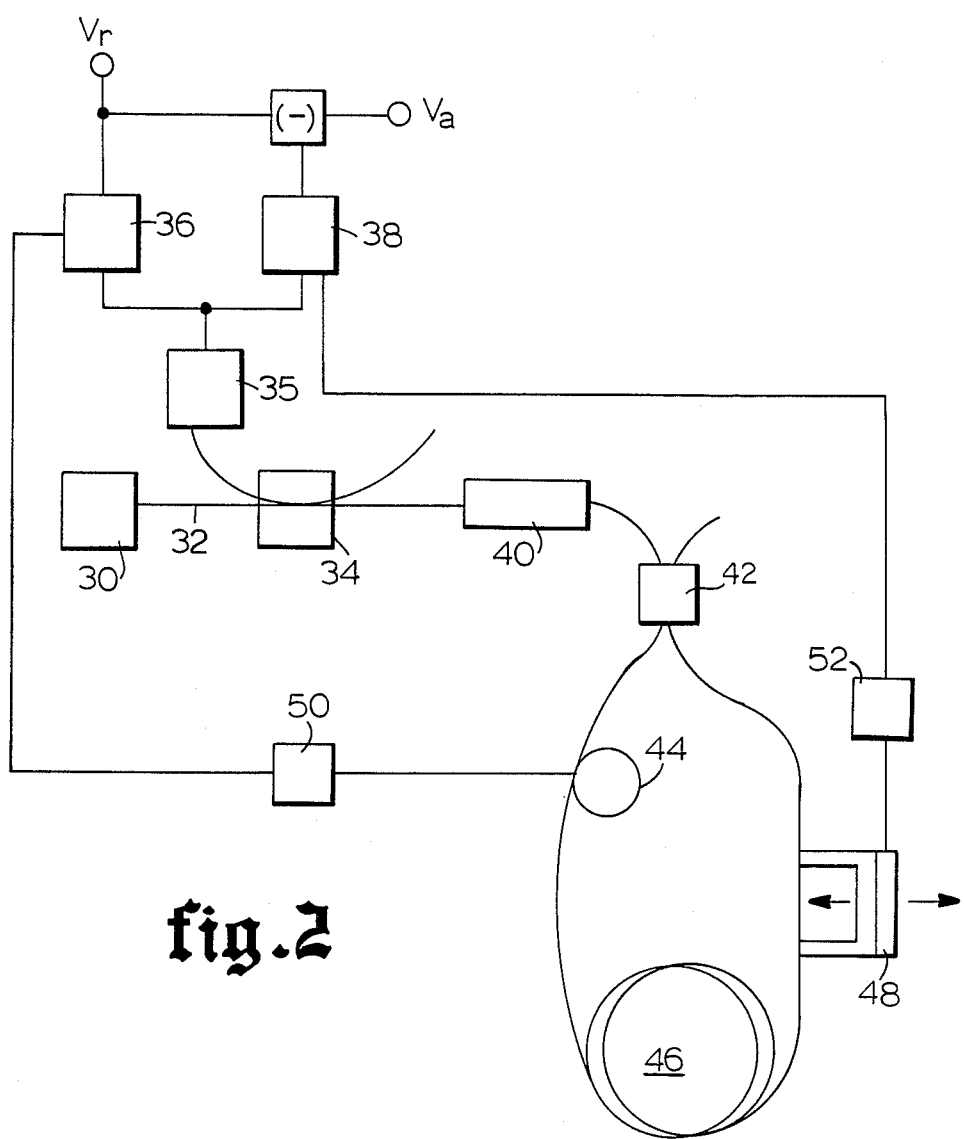
FIG. 2 is an analog fiber optic gyro and accelerometer combination incorporating the principles of this invention.

FIG. 2 illustrates an embodiment of an analog fiber optic gyro having an accelerometer incorporated therein. A light source 30 which could be a light emitting diode or superradiant diode inputs a light signal into an optical fiber 32 in the direction of a beam splitter 34. For high sensitivity applications, the light source may be a pigtailed superradiant laser diode having a thermoelectric cooler circuit controller. One output of the beam splitter 34 is fed to a detector 35 and a pair of synchronous demodulators 36 and 38. The other output of the beamsplitter 34 is fed to a polarizer 40 and into a beamsplitter 42 which splits the light beam into counterpropagating light beams which in turn propagate through a piezoelectric phase modulator driver 44, fiber coil 46, and vibrating fiber accelerometer 48. The polarizer 40 may be a polarizing optical fiber. If the phase modulator 44 is driven at a frequency f by the oscillator 50 and the vibrating fiber accelerometer 48 is driven at a frequency w by the oscillator 52, in the absence of rotation and acceleration, the output of the system will be at 2f and other even harmonics and higher harmonics of 2w. Upon rotation the output of the system will contain f and higher odd harmonics, as well as various harmonics of w. Upon acceleration there will also be a w term and higher order harmonics proportional to acceleration. Since the rotation rate can be determined from the magnitude and phase of f, a rotationally induced portion of the w terms can be subtracted out so that only the amount attributable to acceleration remains. In this manner an output voltage may be generated that is proportional to rotation $V_r$ and one that is proportional to acceleration $V_a$.

Figure 3:
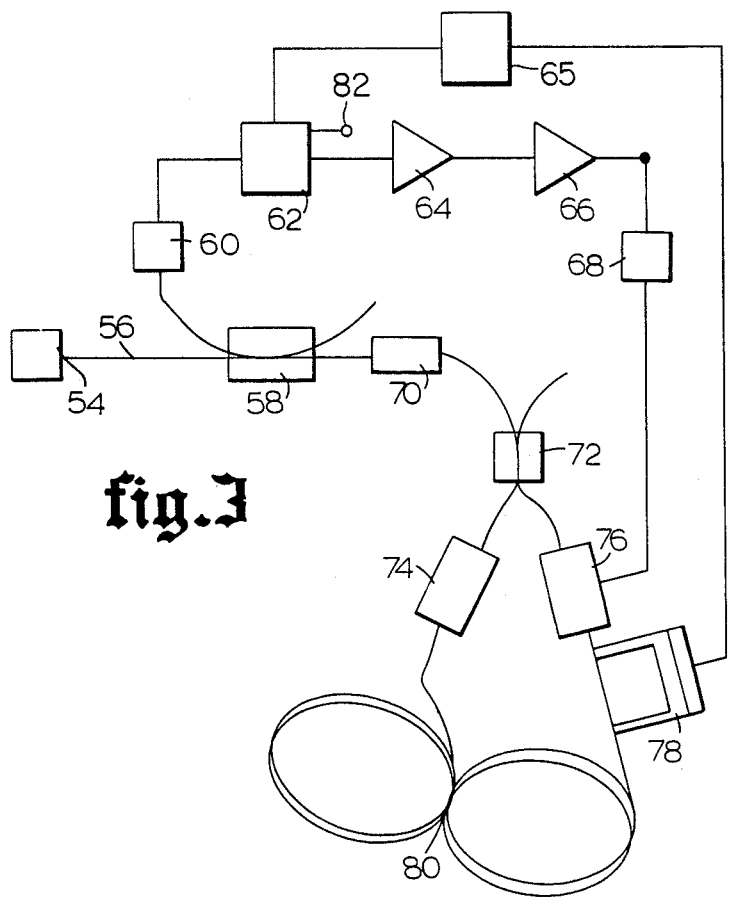
FIG. 3 is a digital phase nulling accelerometer incorporating the principles of this invention.

FIG. 3 illustrates a phase nulling accelerometer incorporating the principles of this invention. A light source 54 inputs a light signal into an optical fiber 56 in the direction of a beamsplitter 58. One output of the beamsplitter 58 is inputted to a detector 60 that is connected to an electronic circuit that includes a synchronous demodulator 62, integrator 64, voltage controlled oscillator 66, and amplifier 68. An oscillator 65 is used to drive the vibrating accelerometer 78 as well as to provide a reference for the synchronous demodulator 62. The second output of the beamsplitter 58 is connected to a polarizer 70 and a second beamsplitter 72. The polarizer 70 may be a polarizing optical fiber. The second beamsplitter 72 splits the polarized light signal into counterpropagating beams. One light beam passes through a frequency shifter 74 and the other counterpropagating beam passes through frequency shifter 76. Connected in the loop of counterpropagating beams are a vibrating fiber accelerometer 78 and a fiber coil 80 wound to reduce rotational sensitivity. The electronics used could be any of many different embodiments, but the basic idea is that an error signal due to acceleration w, whose amplitude depends on the magnitude of the acceleration and whose phase depends on the direction of acceleration is used to close the loop. The signal is nulled out by introducing an offsetting nonreciprocal phase shift through the action of the frequency shifters in combination with the fiber coil forming a phase locked loop system. The signal is synchronously demodulated by the demodulator and the resultant output voltage is applied to an integrator, which in turn corrects the output frequency of the voltage controlled oscillator, closing the feedback loop and nulling the system. This gives a frequency (digital) output 82 which is proportional to acceleration.

Figure 4:
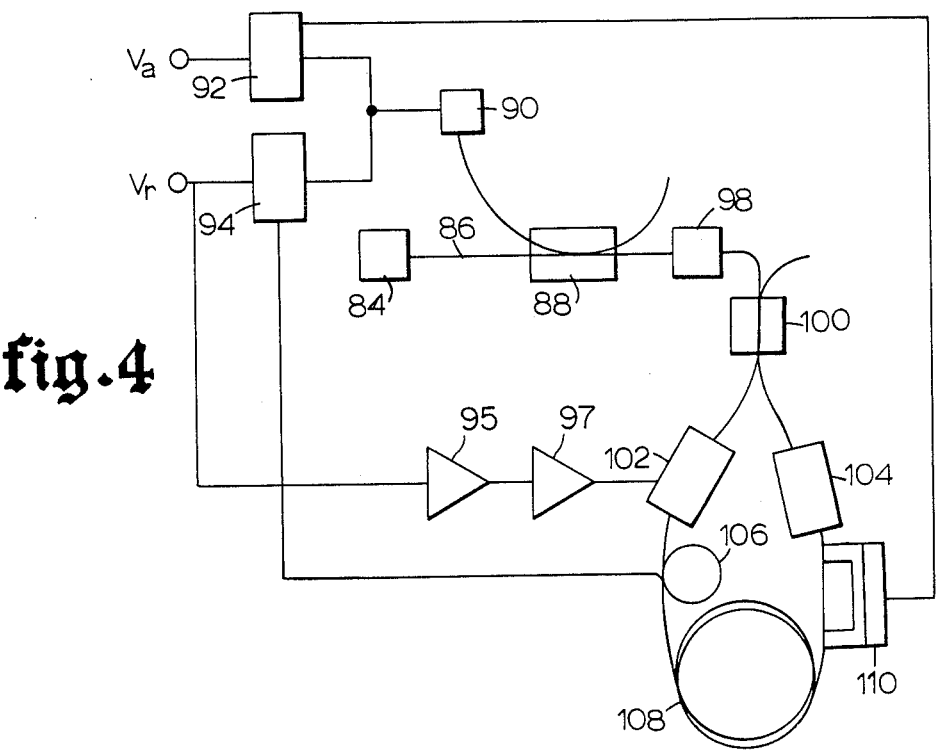
FIG. 4 is a phase nulling optical gyro having an accelerometer incorporating the principles of this invention.

FIG. 4 illustrates a vibrating fiber accelerometer incorporated into a phase nulling optical gryo. In a phase nulling gyro, the signal required to null out a rotation caused phase shift detected at the detector is fed into an electronic feedback system and relayed to an integrator 95 and voltage controlled oscillator 97 resulting in a frequency at the output of the oscillator. The frequency is the output of the device which is proportional to the rotation rate. A light source 84 supplies an input signal to an optical fiber 86 in the direction of a beamsplitter 88. One output of the beamsplitter is sent to a detector 90 and synchronous demodulators 92 and 94. The other output is connected to a polarizer 98 which may also be a polarizing optical fiber and a second beamsplitter 100. The output of the second beamsplitter 100 is connected to an optical fiber loop having contained therein, two frequency shifters 102 and 104, a phase modulator 106, fiber coil 108, and vibrating fiber accelerometer 110. Using the accelerometer in open loop fashion with the phase nulling optical gyro operating closed loop simplifies the accelerometer's support electronics. By incorporating the vibrating fiber accelerometer into the phase nulling optical gyro, rotationally induced phase shifts are automatically balanced out so that the output due to the vibrating fiber accelerometer is directly proportional to acceleration.

Figure 5:
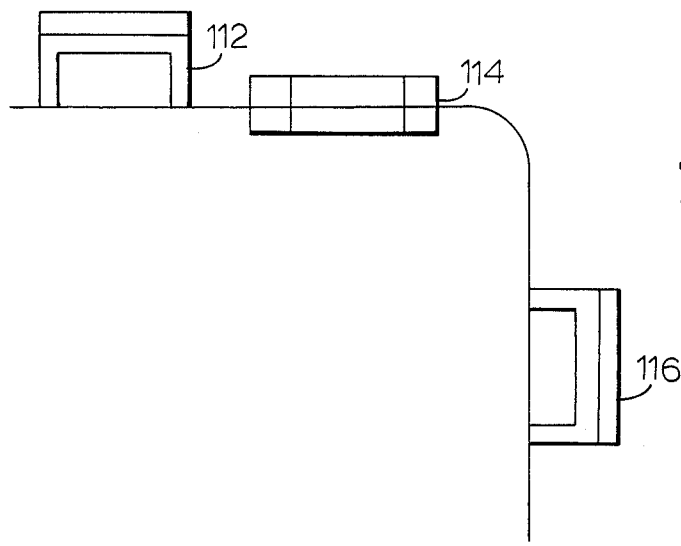
FIG. 5 is a multiple axis accelerometer incorporating the principles of this invention.

FIG. 5 illustrates how a modification of the embodiments shown in FIGS. 1 and 2 may be made where three axes are incorporated onto a single fiber length by mounting three vibrating fiber accelerometer units 112, 114, and 116, orthogonal to each other on a single fiber length. This embodiment provides sensitivity in three different axes of acceleration incorporated in a single unit by operating each of the vibrating fiber accelerometers at appropriately separated characteristic frequencies.

Figure 6:
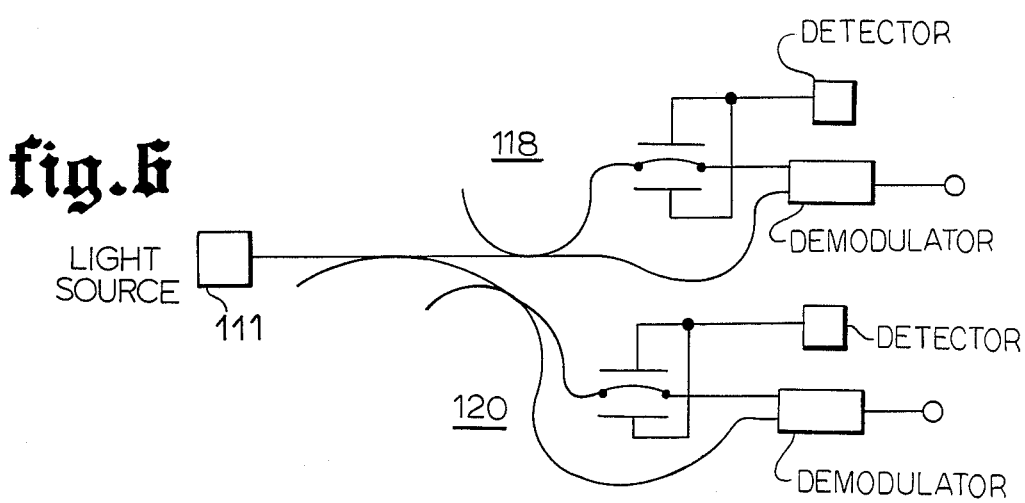
FIG. 6 illustrates a modification of the embodiment shown in FIG. 1 where multiple vibrating fiber accelerometers can be multiplexed for multiple axes

FIG. 6 illustrates a modification of the embodiment shown in FIG. 1 where the beam from the light source 111 is split into a multiple of inputs for several vibrating fiber accelerometers, loops 118 and 120 representing different axes that can be multiplexed for multiple axial sensitivity. Each of the vibrating fiber accelerometer loops has the same elements described in FIG. 1 that are multiplexed for output information for the various axes.

Figure 7:
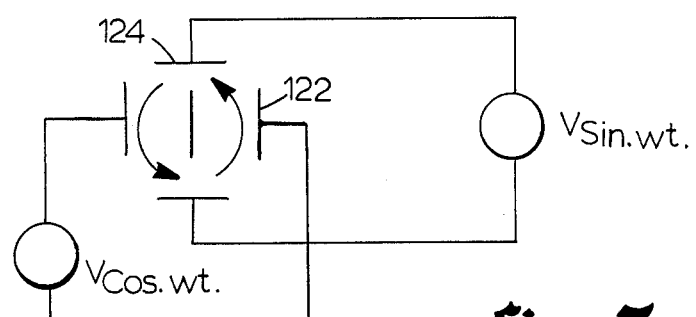
FIG. 7 is a dual axis accelerometer incorporating the principles of this invention.
Figure 10:
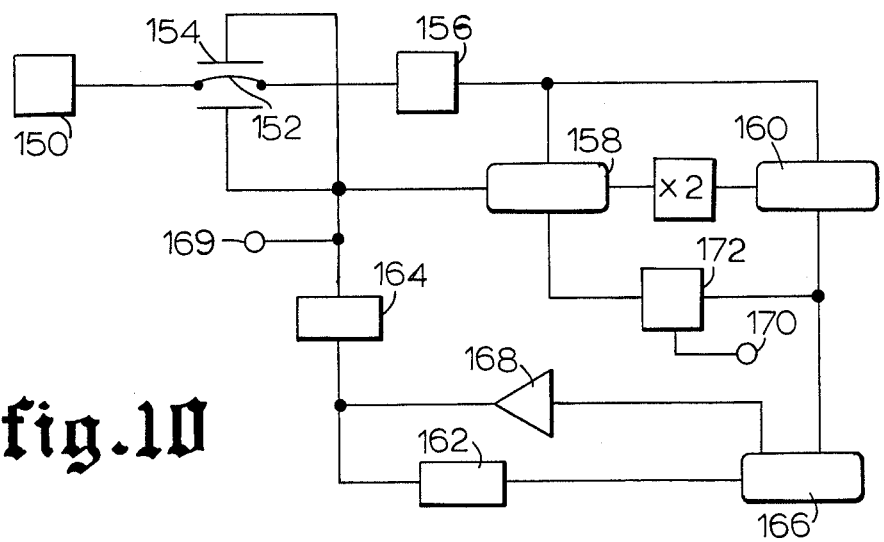
FIG. 10 illustrates a fiber optic accelerometer with a normalization circuit having a scale factor correction oscillator.

FIG. 7 illustrates a dual axis unit which can be configured by spinning the fiber about its central axis. This can be accomplished by using electrostatic deflection of a conductively coated fiber between two orthogonal sets of electrodes 122 and 124 operated at V sin wt and V cos wt, respectively, or mechanically by moving the platform in a circular motion. This configuration gives a quadrupole output that can be demodulated to extract acceleration along two sensitive axes. The dual axis accelerometer unit replaces the accelerometer units, such as 48 and 152 shown in FIGS. 2 and 10 shown in FIG. 1.

The fiber-optic accelerometers described above operate most effectively under constant tension conditions for the suspended movable vibrating fiber. Changing resonance conditions due to tension changes will result in scale factor changes. This can be minimized by selection of off resonance operating conditions.

Figure 8:
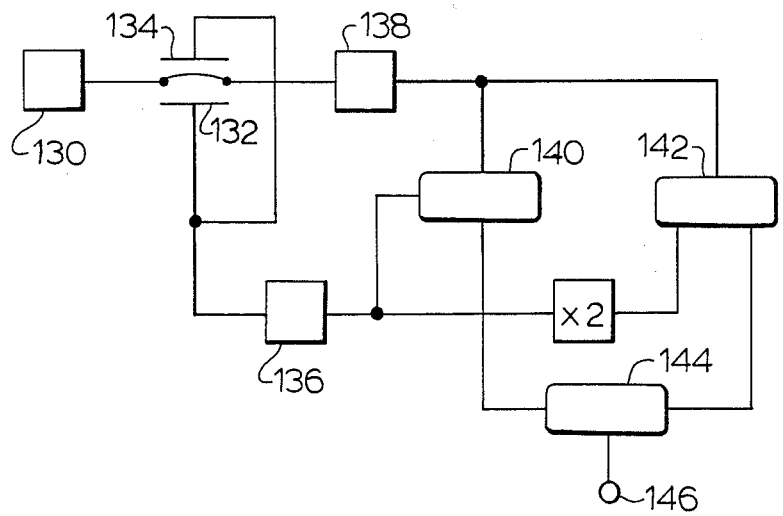
FIG. 8 illustrates a fiber optic accelerometer with a normalization circuit for tension effects.

A simple normalization scheme may be used to correct for scale factor changes as is shown in FIG. 8. This circuit consists of the light source 130, the suspended fiber 132, electrical plates 134 driven by the oscillating source 136, and detector 138. A first harmonic synchronous demodulator 140 is connected to the detector output in parallel with a second harmonic synchronous demodulator 142 for scale factor correction. Each demodulator is connected to a normalization circuit 144 that provides a normalized output 146. Here the second harmonic of the drive frequency f is used as a normalization factor for the signal at frequency f. Other even harmonics could also be used to normalize odd harmonic signals as an output.

Figure 9:
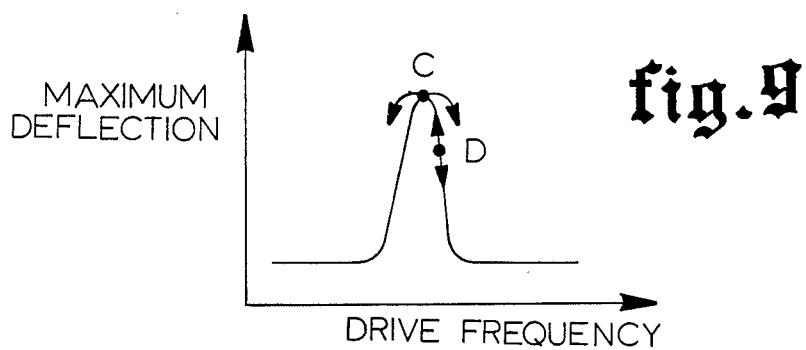
FIG. 9 illustrates the deflection of the fiber as a function of the drive frequency.

The resonant frequencies of the suspended movable fiber under tension are given by $W_n = n(\tau)^{\frac{1}{2}}$ where $\tau$ is the tension on the fiber, and n is the order of the resonance. FIG. 9 illustrates that as the drive frequency changes and moves through resonance the deflection of the fiber reaches a peak.

Now suppose the drive frequency is oscillated in a sinusoidal fashion at frequency S about the peak resonant point C shown in FIG. 9. The circuit shown in FIG. 10 illustrates a means to track the tension changes in the accelerometer. It consists of a light source 150, suspended fiber 152, electrical plates 154, detector 156 and voltage controlled oscillator 164 connected to first and second harmonic synchronous demodulators 158 and 160. A scale factor correction oscillator 162 generates a voltage signal of frequency 8 which is used to oscillate the center drive frequency of the voltage controlled oscillator 164. As the tension changes, the operating condition will move off this peaked condition to a new position say D in FIG. 9 in this case a first harmonic signal S will occur whose amplitude is an indication of the tension change and where phase depends upon whether the tension increased or decreased. This signal is detected by a synchronous demodulator 166 which applies a voltage to integrator 168 which controls the voltage controlled oscillator 164 adjusting the drive frequency to be peaked at the resonance of the suspended fiber. A normalized output is provided at 170 by the normalization circuit 172. Tension may be monitored at output 169 as the frequency output of the voltage controlled oscillator and may be used to correct scale factor or in a closed loop to maintain a constant tension on the movable fiber.

It is also possible to use this technique to create an entire class of fiber-optic sensors which monitor environmental effects that cause the suspension points to change the tension on the movable fiber.

Another method of detection would be to counterbalance the acceleration induced deflection by an adjusted dc magnetic field. The current required to null out the acceleration induced deflection of the fiber is the output of the device.

Although there has been illustrated and described specific detail and structure of operation, it is clearly understood that the same were merely for purposes of illustration and that changes and modifications may be readily made therein by those skilled in the art without departing from the spirit and scope of this invention.

What we claim is:

1. A solid state accelerometer, comprising:
   (a) a light source means for providing a light beam input;
   (b) an optical fiber connected to the light source means for receiving the light beam input;
   (c) a beam splitting means connected to the optical fiber for splitting the first light beam into second and third light beams;
   (d) a second optical fiber connected to the beam splitting means for receiving the second light beam;
   (e) a support means for suspending the second optical fiber between two points under a predetermined tension;
   (f) a vibrating means for vibrating the optical fiber at a frequency f between the two points of the support means; and
   (g) a reference optical fiber connected to the beam splitting means for receiving the third light beam for interferometric comparison;
   (h) a detection means connected to the output of the second optical fiber and the output of the reference fiber for detecting acceleration induced phase modulation of the second light beam at the output of the optical fiber including electrical circuitry means for indicating the quantity of acceleration present with respect to third light beam in interferometric comparison.

2. A solid state accelerometer and fiber optic gyro combination, comprising:
   (a) a light source means for producing a first beam of light;
   (b) a first beam splitting means for receiving the first beam of light having a polarizing means connected to one output for polarizing the first light beam;
   (c) a second beam splitting means connected to the polarizing means for splitting the first beam of light into second and third beams of light and recombining the second and third beams into a fourth beam of light;
   (d) an optical fiber loop connected to the second beam splitting means for directing the second and third beams of light in opposite means for directing the second and third beams of light in opposite directions along a path about a predetermined axis about which rotation is be measured to establish a counterpropagating light path for the second and third light beams;
   (e) an optical fiber for establishing the counterpropagating light path wound in a coil about a predetermined axis about which rotation is to be measured, the optical fiber having the first and second ends, and coupling means for applying the second and third beams of light to the first and second fiber ends respectively;
   (f) a phase modulator means connected to the optical fiber loop for creating a nonreciprocal phase shift between the second and third light beams;
   (g) a vibrating means for vibrating the optical fiber loop at a frequency f; and
   (h) a detection means connected to the first beam splitting means for detecting rotation and acceleration induced modulation of the fourth light beam recombined at the output of the optical fiber loop including electrical circuitry means for indicating the quantity of rotation and acceleration present.

3. A phase nulling accelerometer, comprising:
   (a) a light source means for producing a first beam of light;
   (b) a first beam splitting means for receiving the first beam of light having a polarizing means connected to one output for polarizing the first light beam;
   (c) a second beam splitting means connected to the polarizing means for splitting the first beam of light into second and third beams of light and recombining the second and third beams into a fourth beam of light;

(d) a first frequency shifter connected to the second beam splitting means for phase shifting the second beam of light;

(e) a second frequency shifter connected to the second beam splitting means for phase shifting the third beam of light;

(f) an optical fiber loop connected to the first and second frequency shifters for directing the second and third beams of light in opposite directions along a path about a predetermined axis about which rotation is to be measured to establish a counterpropagating light path for the the second and third light beams;

(g) an optical fiber wound in a coil having double loop configuration to reduce rotational sensitivity, the optical fiber having first and second ends, and coupling means for applying the second and third beams of light to the first and second fiber ends respectively;

(h) a vibrating means for vibrating the optical fiber loop at a frequency f; and (i) a detection means connected to the first beam splitting means for detecting rotation and acceleration induced modulation of the fourth light beam recombined at the output of the optical fiber loop including electrical circuitry means for indicating the quantity of rotation and acceleration present.

4. An accelerometer and phase nulling fiber optic gyro combination, comprising:

(a) a light source means for producing a first beam of light;

(b) a first beam splitting means for receiving the first beam of light having a polarizing means connected to one output for polarizing the first light beam;

(c) a second beam splitting means connected to the polarizing means for splitting the first beam of light into second and third beams of light and recombining the second and third beams into a fourth beam of light;

(d) a first frequency shifter connected to the second beam splitting means for phase shifting the second beam of light;

(e) a second frequency shifter connected to the second beam splitting means for phase shifting the third beam of light;

(f) an optical fiber loop connected to the first and second frequency shifters for directing the second and third beams of light in opposite directions along a path about a predetermined axis about which rotation is be measured to establish a counterpropagating light path for the second and third light beams;

(g) an optical fiber for establishing the counterpropagating light path wound in a coil about a predetermined axis about which rotation is to be measured, the optical fiber having first and second ends, and coupling means for applying the second and third beams of light to the first and second fiber ends respectively;

(h) a phase modulator means connected to the optical fiber loop for creating a nonreciprocal phase shift between the second and third light beams;

(i) a vibrating means for vibrating the optical fiber loop at a frequency f; and (j) a detection means connected to the first beam splitting means for detecting rotation and acceleration induced modulation of the fourth light beam recombined at the output of the optical fiber loop including electrical circuitry means for indicating the quantity of rotation and acceleration present.

5. A device as recited in claim 1 wherein the electrical circuitry is generally comprised of:

(a) an oscillator that is disposed to vibrate the suspended fiber and provide a reference input to a synchronous demodulator; and (b) a synchronous demodulator for demodulating the output signal due to acceleration and providing an output voltage whose amplitude is a measure of the amplitude of the acceleration and whose sign is dependent on the direction of the acceleration.

6. A device as recited in claim 2 wherein the electrical circuitry is generally comprised of:

(a) a first synchronous demodulator means disposed to monitor the rotationally induced signal from the fiber coil and provides an output voltage proportional to the rotation rate with a sign that is dependent upon the direction of rotation;

(b) a second synchronous demodulator disposed to monitor the amplitude and phase of the acceleration induced signal from the vibrating fiber and provides an output voltage that contains both acceleration and rotation induced signals; and (c) a processing circuit for subtracting the rotationally induced portion of the output voltage indicated by the first synchronous demodulator from the combined acceleration and rotation output voltage of the second synchronous demodulator and provides a signal proportional to acceleration only.

7. A device as recited in claim 3 wherein the electrical circuitry is generally comprised of:

(a) a synchronous demodulator means for producing a demodulated output signal;

(b) an integrator which receives the demodulator signal output and (c) a controllable oscillator to which is inputted the acceleration output signal that controls the frequency of the output thereof which is indicative of the acceleration about a predetermined axis.

8. A device as recited in claim 4 wherein the electrical circuitry is generally comprised of:

(a) a first synchronous demodulator means disposed to monitor the rotationally induced signal from the fiber coil and provides an output voltage proportional to the rotation rate with a sign that is dependent upon the direction of rotation;

(b) a second synchronous demodulator disposed to monitor the amplitude and phase of the acceleration induced signal from the vibrating fiber and provides an output voltage that contains acceleration induced signals; and (c) an integrating means which receives the first demodulator signal output and produces therefrom; a rotation rate output signal proportional to the rotation rate with a sign that is dependent upon the direction of rotation; and (d) a controllable oscillating means to which is inputted the rotation rate output signal to provide a frequency output proportional to the rotation rate that is used to null out rotationally induced phase.

9. A solid state accelerometer, comprising:

(a) a light source means for providing a light beam input;

(b) an optical fiber connected to the light source means for receiving the light beam input;

(c) a first beam splitter connected to the optical fiber for splitting the light beam input into a plurality of light beams;
(d) a plurality of optical fibers connected to the beam splitter for receiving the plurality of light beams;
(e) a plurality of support means for suspending each of the plurality of optical fibers between two points under a predetermined tension;
(f) a plurality of vibrating means for vibrating each of the plurality of optical fibers at a frequency f between the two points of the support means; and
(g) a plurality of reference optical fibers in parallel with each of the plurality of vibrating means for receiving the third light beam for interferometric comparison; and
(h) a detection means for detecting acceleration induced modulation of the plurality of light beams at the output of the plurality of optical fibers including electrical circuitry means for indicating the quantity of acceleration present.

10. A solid state accelerometer, comprising:
(a) a light source means for providing a light beam input;
(b) an optical fiber connected to the light source means for receiving the light beam input;
(c) a plurality of support means for suspending the optical fiber between multiple points of the fiber under a predetermined tension;
(d) a plurality of vibrating means for vibrating the optical fiber in orthogonal planes at distinct separable frequencies between the multiple points of the plurality of support means; and
(e) a detection means for detecting acceleration induced modulation of the light beam at the output of the optical fiber including electrical circuitry means for indicating the quantity of acceleration present.

11. A solid state accelerometer, comprising:
(a) a light source means for providing a light beam input;
(b) an optical fiber connected to the light source means for receiving the light beam input;
(c) a beam splitting means connected to the optical fiber for splitting the first light beam into second and third light beams;
(d) a second optical fiber connected to the beam splitting means for receiving the second light beam;
(e) a support means for suspending the second optical fiber between two points under a predetermined tension;
(f) a vibrating means for vibrating the optical fiber at a frequency f between the two points of the support means; and (g) a reference optical fiber connected to the beam splitting means for receiving the third light beam for interferometric comparison;
(h) a detection means connected to the output of the second optical fiber and the output of the reference fiber for detecting acceleration induced phase modulation of the second light beam at the output of the optical fiber including electrical circuitry means for normalizing scale factor changes due to tension effects providing a normalized output indicating the quantity of acceleration present with respect to third light beam in interferometric comparison.

12. A solid state accelerometer as recited in claim 11 wherein the second harmonic of the drive frequency f is used as a normalization factor for the output signal at frequency f.

13. A solid state accelerometer as recited in claim 12 wherein the frequency f of the vibrating fiber means is oscillated by a second sinusoidal frequency 'f' about a peak resonance point producing a first harmonic signal of 'f' which is demodulated to provide a voltage to the vibrating fiber means adjusting the frequency to be peaked at the resonance of the suspended fiber.

14. A solid state accelerometer, comprising:
(a) a light source means for providing a light beam input;
(b) an optical fiber connected to the light source means for receiving the light beam input;
(c) a beam splitting means connected to the optical fiber for splitting the first light beam into second and third light beams;
(d) a second optical fiber connected to the beam splitting means for receiving the second light beam;
(e) a support means for suspending the second optical fiber between two points under a predetermined tension;
(f) a vibrating means for vibrating the optical fiber at a frequency f in a circular motion about its center axis between the two points of the support means; and
(g) a reference optical fiber connected to the beam splitting means for receiving the third light beam for interferometric comparison;
(h) a detection means connected to the output of the second optical fiber output of the reference fiber for detecting acceleration induced phase modulation of the second light beam at the output of the optical fiber including electrical circuitry means for demodulating the signal to extract acceleration along two sensitive axes indicating the quantity of acceleration present with respect to the third light beam.

* * * * *